United States Patent [19]

Winckelhaus

[11] 4,390,301

[45] Jun. 28, 1983

[54] FRICTION CONNECTION BETWEEN A WHEEL AND A SHAFT WITH FORCE INDICATOR

[76] Inventor: Werner Winckelhaus, Manteuffelstrasse 13, D-4100 Duisburg, Fed. Rep. of Germany

[21] Appl. No.: 306,541

[22] Filed: Sep. 28, 1981

[30] Foreign Application Priority Data

Oct. 1, 1980 [DE] Fed. Rep. of Germany ....... 3036979

[51] Int. Cl.³ .......................... B25G 3/00; F16D 1/00; F16G 11/00
[52] U.S. Cl. ..................................... 403/27; 403/370; 416/61; 415/118; 73/862.54
[58] Field of Search .................... 403/27, 369, 370; 116/212; 415/118; 416/61; 29/407; 407/74, 78; 408/16; 172/430; 73/862.54

[56] References Cited

U.S. PATENT DOCUMENTS

| | | | |
|---|---|---|---|
| 3,052,123 | 9/1962 | Gustafson | 29/407 X |
| 4,117,719 | 10/1978 | Schütz | 73/862.54 |
| 4,191,488 | 3/1980 | Bickerton | 403/370 |
| 4,203,319 | 5/1980 | Lechler | 73/862.54 |
| 4,268,185 | 5/1981 | Müllenberg | 403/370 |
| 4,281,539 | 8/1981 | Keller | 73/862.54 |

FOREIGN PATENT DOCUMENTS

| | | |
|---|---|---|
| 874226 | 3/1953 | Fed. Rep. of Germany. |
| 1294751 | 2/1971 | Fed. Rep. of Germany. |
| 2852494 | 6/1980 | Fed. Rep. of Germany. |

*Primary Examiner*—Wayne L. Shedd
*Attorney, Agent, or Firm*—Karl F. Ross; Herbert Dubno

[57] ABSTRACT

A friction connection is formed between an annular member such as a wheel, pulley or the like and a shaft by at least one annular wedge which clamps the annular member to the shaft by translating axial pressure from wedge-tightening screws into radial clamping forces. According to the invention, the annular member is provided with a groove centered on the axis of rotation and receiving an open measuring ring at least partly slidable in the groove, the relative spacing of the ends of which serves to indicate the radial clamping force.

6 Claims, 5 Drawing Figures

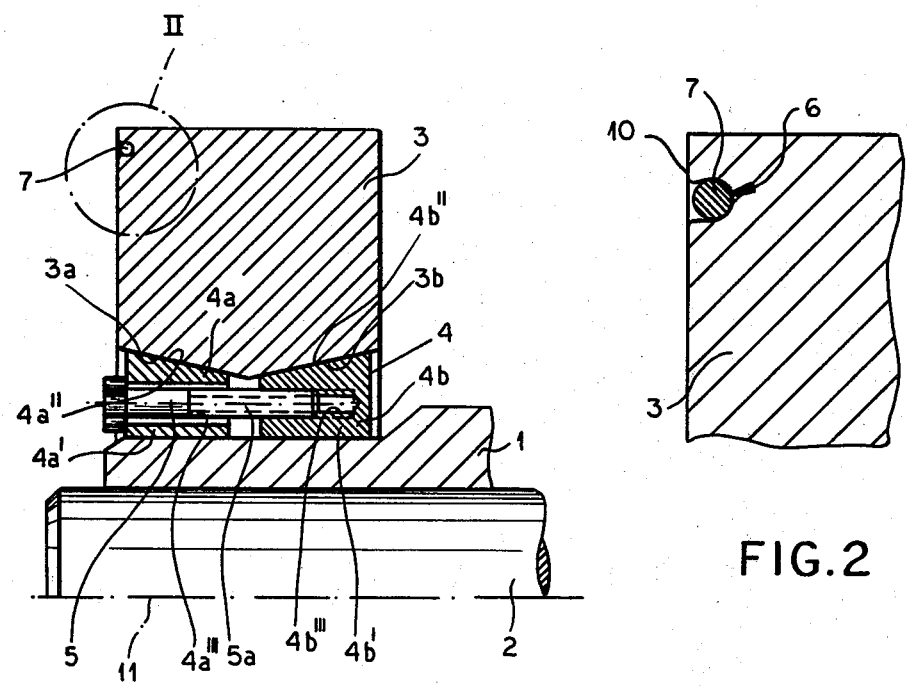
FIG.1
FIG.2
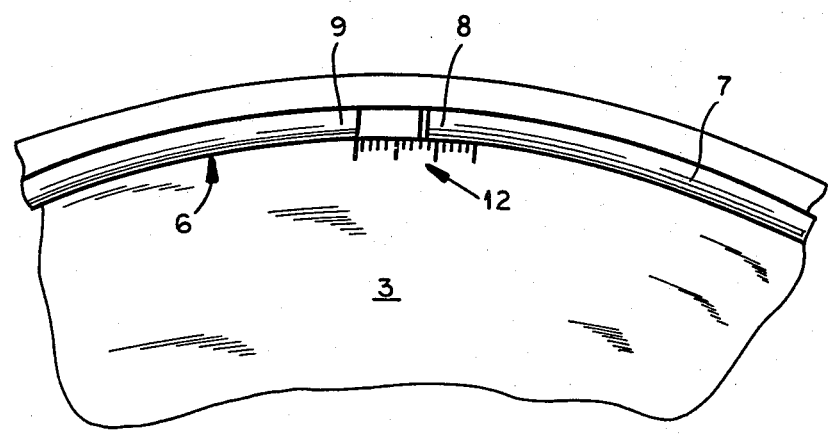
FIG.3

FRICTION CONNECTION BETWEEN A WHEEL AND A SHAFT WITH FORCE INDICATOR

FIELD OF THE INVENTION

My present invention relates to the frictional connection of wheels, disks, pulleys and the like, hereinafter referred to generally as annular members, and a shaft so as to rotatably entrain the shaft with the annular member or vice versa.

BACKGROUND OF THE INVENTION

While a variety of techniques can be used to connect annular members of the aforedescribed type to respective shafts, e.g. flange couplings, keys, force fitting, beam and weld connections, it is a common practice to secure the hub of such an annular member to the shaft by a wedging action developed by translating axial force into radial forces.

For example, a sleeve of a wheel, pulley or the like may be fitted onto the shaft and surrounded by an annular wedge having at least one frustoconical surface juxtaposed with a frustoconical surface of a support ring or disk adapted to take up radial stress.

When the wedging ring is forced axially between the disk and the hub, e.g. by a multiplicity of angularly equispaced screws or bolts extending parallel to the axis of rotation and connected, for example, to an oppositely inclined wedging ring, outward radial forces are applied to the disk which are equivalent to inward radial or compression forces which press the sleeve or hub against the shaft and thus provide a friction-tight fit of the hub upon the shaft.

The wedge thus functions as a direction-changing mechanism whereby the axial forces generated by tightening of the screws or bolts are transformed into radial forces which react against the support ring or disk and thus permit the sleeve to be compressed against the shaft.

In the foregoing description, the support ring or disk, the frustoconical wedging surfaces and the wedging ring or rings have been described as elements separate from the shaft or hub. Of course the same principles can apply to the shaft form part of the clamping system. For instance, the wheel or hub can form the support ring and can be provided with frustoconical surfaces directly engaged by the frustoconical surfaces of the wedging rings which can bear directly against the shaft or against an inwardly deformable hub portion which, in turn, bears against the shaft. Alternatively, the support disk or ring need not be provided with the frustoconical surfaces directly, these being provided on the shaft or a compression ring interposed between the wedging ring and the shaft or between the wedging ring and the support ring or the wheel itself when the latter forms the support ring.

Devices of the aforedescribed type have been described in a wide variety of embodiments. In German Pat. No. 874,226, for example, the stack of wedges applies radial force directly to the hub on the one hand and to the shaft on the other. The arrangement described in German Pat. No. 1,294,751 and U.S. Pat. No. 3,782,841, provides a wedge upon the sleeve and a pair of rings, forming the support rings, with complementary wedging surfaces which are drawn together by the angularly equispaced bolts. Similar arrangement is disclosed in German patent document (open application) No. 28 52 494 wherein, however, a wedge is interposed between the sleeve and the support ring. Here the wedge ring is axially displaced by the bolts relative to another wedge ring or to a wedging formation directly upon the sleeve.

In the arrangement of German Pat. No. 874,226, therefore, the torque transfer is effected directly through the wedge arrangement and possibly the support disk whereas in the other systems the wedge arrangement and support disk may lie outside the torque flow path because of the direct frictional contact of the wheel or hub and the shaft.

In these latter cases, the sleeve or hub is forced to friction-tight engagement with the shaft with the compression force being a function of the tension developed by the screws or bolts.

In practice, this tension or axial stress may vary widely and, even when the bolts are tightened with a torque wrench to a predetermined degree, the conversion of this tractive force to the radial force is found to vary widely depending upon materials and other characteristics of the wedging assembly.

As a result, the friction characteristics vary and it is difficult with existing devices to determine with any degree of precision whatsoever, the friction interaction generated by the tightening of the bolts.

As far as I am aware that has been no realistic device heretofore proposed which forms part of the clamping assembly and is capable of indicating the clamping forces developed.

Of course, as has been discussed in *Maschinenmarkt*, 1980 pp. 1382–1383, it is possible to control the clamping force by the torque applied to the bolts in the manner described. However, the bolts vary sufficiently with respect to the frictional characteristics of their threads, play and dimensional tolerances so that there are practically unavoidable discrepancies between the force which is developed by any clamping device of the type described and the torque applied to the bolts. In fact this discrepancy has been found to be as much as 25%.

It is possible to eliminate some of the problems by providing the screws with detectors responsive to the actual axial forces developed but these systems have not proved to be practical in applications to friction clamping arrangements of the type described above.

OBJECT OF THE INVENTION

It is, therefore, the principal object of the present invention to provide an improved friction clamping device with an integrated indicator or measurement unit capable of indicating the compression pressure developed by the device.

SUMMARY OF THE INVENTION

This object is achieved according to the invention in a clamping arrangement of the type described, i.e. having an annular support member, at least one wedge ring and a plurality of angularly spaced screws or bolts for axially displacing the wedge ring, thereby generating radial compression forces which react upon the support ring or disk and serve to frictionally lock a wheel or the like to a shaft. According to the invention, the disk is formed with an annular groove centered on the axis of rotation and preferably along a peripheral region of the disk in which an open or split measuring ring is received, the relative positions of the ends of this ring signaling the radial stress to which the disk is subject.

The present invention utilizes the phenomenon that the disk, serving to take up the reaction forces generated by axial displacement of the wedge ring, tends to expand as these forces increase, this expansion spreading the groove in which the measuring ring is received. If, therefore, at least one end of this measuring ring forms an indicator capable of signaling the spreading of the disk, the resulting indication will be a measurement of the compression forces directly.

According to a feature of the invention, one end of the measuring ring is fixed in the groove while the free end of the measuring ring serves as an indicator.

Means can be provided for preventing the escape of the measuring ring and such means can include, for example, undercutting of the groove so that the measuring ring is a so-called captive ring.

The groove can be cut directly into the disk or can be formed by ridges therein and is preferably concentric with the wedge ring, hub and shaft. The groove along one edge can be peened over the measuring ring along one edge to form an overhang preventing escape of the ring. The latter is preferably composed of steel.

Index marks can be provided on the disk along the groove to cooperate with the indicating end of the measuring ring or this end of the measuring ring can be connected to a strain gauge which can be connected, in turn, in a strain gauge circuit to provide an electrical output measuring the pressure. Any other means for measuring the spacing between the ends of the measuring ring or the position of the free end of the measuring ring relative to the disk can be utilized as well.

Measurements with high precision are obtained with the system of the invention and the measurement precision increases with increasing diameter of the groove and disposition of the latter close to the outer periphery of the disk.

BRIEF DESCRIPTION OF THE DRAWING

The above and other objects, features and advantages of the present invention will become more readily apparent from the following description, reference being made to the accompanying drawing in which:

FIG. 1 is a fragmentary axial cross-sectional view through a portion of a clamping device embodying the present invention;

FIG. 2 is an enlarged section of the region II of FIG. 1;

FIG. 3 is an end view of this region;

SPECIFIC DESCRIPTION

Figure 4:
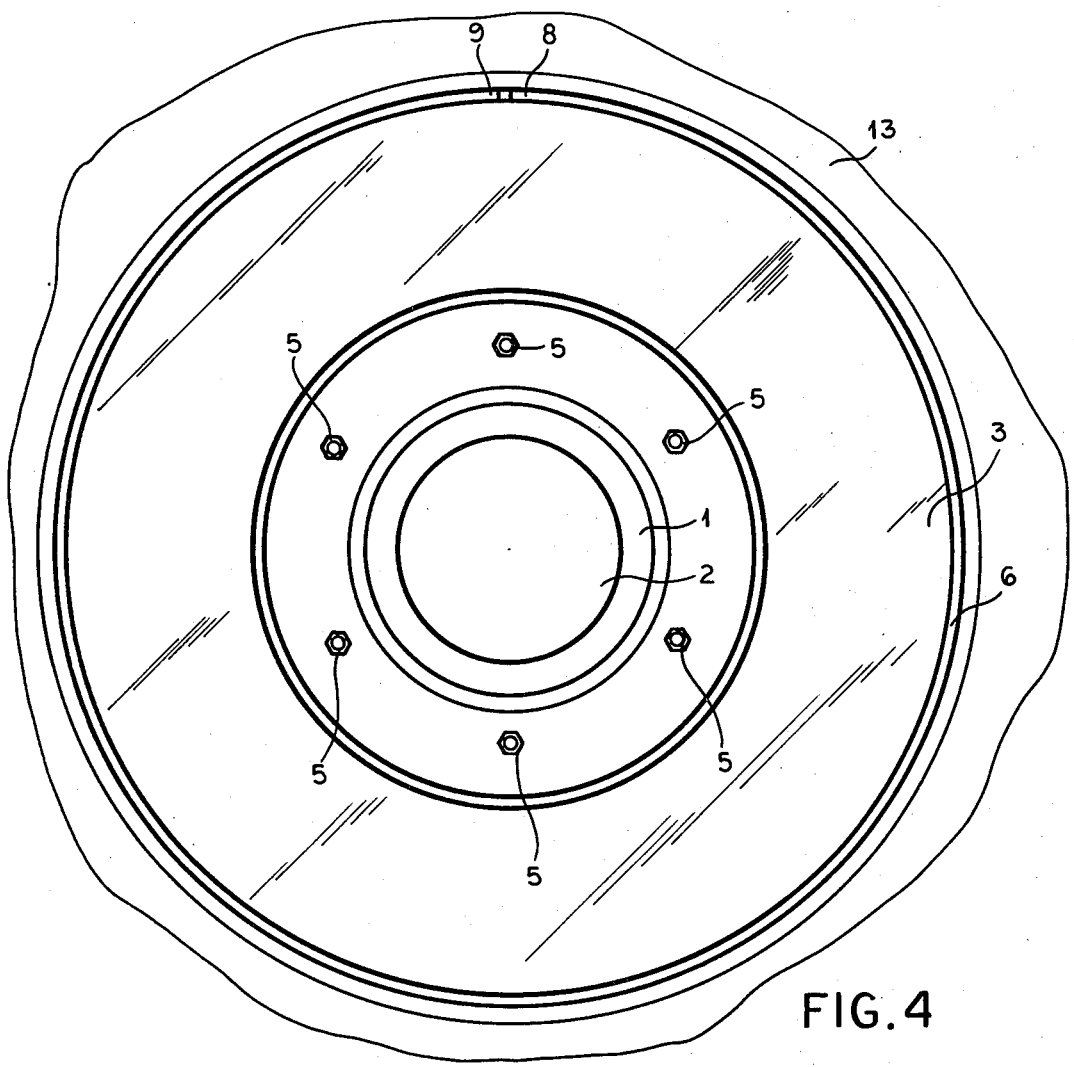
FIG. 4 is an end view of the device drawn to a smaller scale.

In FIGS. 1 through 4 of the drawing, I show a device for clamping the hub 1 of a wheel, pulley or other annular member 13 against the outer periphery of a shaft 2. This device comprises a stress-absorbing reaction ring or disk 3 which coaxially surrounds the sleeve 1 and is formed internally with a pair of oppositely converging frustoconical surfaces 3a and 3b.

The wedge arrangement 4 for transforming axial force into radial force in the manner previously described, comprises a pair of wedge rings 4a and 4b which have cylindrical surfaces 4a', 4b' enabling them to fit slidably on the sleeve 1, and frustoconical surfaces 4a'', 4b'' complementary to the surfaces 3a and 3b.

The wedge rings 4a and 4b have axial widths which, in sum, are less than the axial width of the disk 3 so that they are spaced apart.

The rings 4a and 4b may be drawn together by a multiplicity of angularly equispaced bolts or screws 5 which, as shown in FIG. 1, can have threaded ends 5a screwed into blind bores 4b'' but passing with clearance through the unthreaded bores 4a''' of the ring 4a.

Thus, as each of the screws 5 is tightened the wedge rings 4a and 4b are drawn together and the sleeve 1 and disk 3 are urged apart by translation of the axial screw forces into radial forces. These radial forces compress the sleeve 1 against the shaft 2 to provide a friction connection and simultaneously tend to expand the disk 3.

The disk 3 is formed adjacent its outer periphery with a circular groove 6 which is preferably coaxial with the shaft and in which a split or open measuring ring 7 is slidably received. One end 9 is fixed in the groove 6 while the other end 8 forms a measurement indicator for the spread of the disk.

The groove 6 has an edge which is peened over the ring 7 to prevent the latter from escaping. End 9 can be fixed by a support weld or by any other means.

Adjacent the free end 8, the edge of the groove is formed with a scale 12 which directly displays the value of the compression force, the value along the scale being signaled by the position of the free end 8.

Since the friction coefficient $\mu = 0.15$ for steel against steel is known, the frictional force for any particular torque transfer between the sleeve and the shaft can be ascertained by simple calculation from the compression force.

Figure 5:
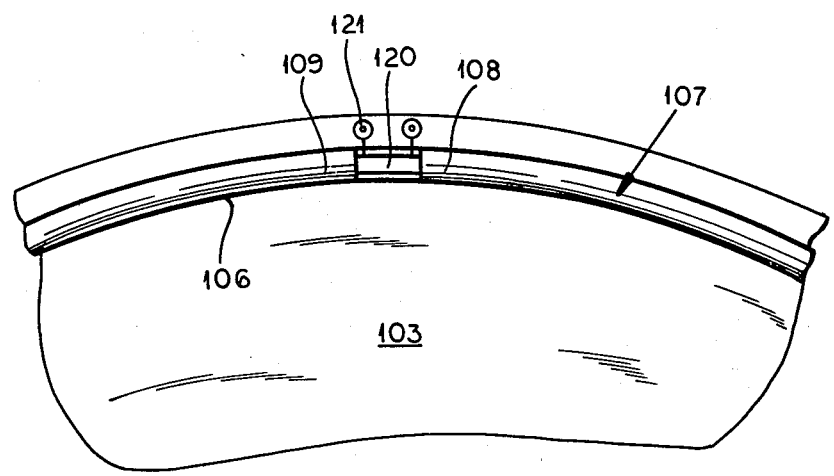
FIG. 5 is a view similar to FIG. 3 but illustrating another embodiment of the invention.

In FIG. 5 the disk 103, corresponding to the disk 3, has a groove 106 receiving a ring 107 whose ends 108 and 109 are bridged by a strain gauge 110 whose terminals 121 can be connected to an appropriate circuit displaying the measurement. Here again the compression force is signaled as a function of the position of the end of a measuring ring. The strain gauges used can be of the type described in chapter 16, pp. 10 ff. of Mark's *Mechanical Engineer's Handbook*, McGraw-Hill Book Co., New York, 1958.

I claim:

1. A device for frictionally coupling a hub to a shaft, comprising:
    an annular disk surrounding said shaft and adapted to support radial force;
    wedge means including at least one axially displaceable member surrounding said shaft and shiftable for transforming axial force into radial forces which are applied to said disk tending to expand said disk and to frictionally couple said hub and said shaft;
    a plurality of screws angularly equispaced about said shaft and generally parallel thereto for axially displacing said member and applying said axial forces thereto; and
    means on said disk for signaling the degree of expansion thereto, thereby indicating the radial force with which said hub is frictionally coupled with said shaft.

2. The device defined in claim 1 wherein said indicating means includes a groove formed in said disk and an open measuring ring slidably received in said groove whereby the relative positions of the ends of said measuring ring indicate the degree of expansion of said disk.

3. The device defined in claim 2 wherein one of said ends is fixed in said groove, the opposite end of said measuring ring forming an indicator shiftable along a scale formed on said disk.

4. The device defined in claim 3 wherein said groove is concentric with said shaft.

5. The device defined in claim 4 wherein said measuring ring is composed of steel.

6. The device defined in claim 2, claim 3, claim 4 or claim 5 wherein said indicating means includes a strain gauge connected between the ends of said ring for generating an electrical signal representing the expansion of said disk.

* * * * *